United States Patent Office 3,496,127
Patented Feb. 17, 1970

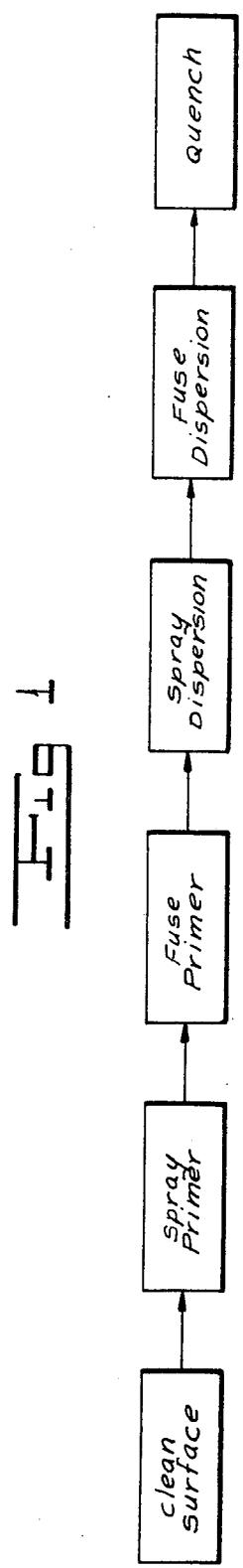

3,496,127
AQUEOUS PLASTIC COATING MATERIAL SUSPENSIONS
Jack Simon, Paterson, N.J., assignor to General Plastics Corporation, Bloomfield, N.J., a corporation of New Jersey
Filed Feb. 1, 1966, Ser. No. 524,237
Int. Cl. C09d 3/70, 3/48
U.S. Cl. 260—13
12 Claims

ABSTRACT OF THE DISCLOSURE

Certain insoluble thermoplastic resins such as chlorinated polyether or polymeric amides are adapted to form strong, tough dimensionally stable and chemically resistant surfaces. No suitable or practical way is known of applying these synthetic polymers to form an interior coating of vessels. This invention comprises forming a sprayable dispersion of these polymers in powdered form in a nonreactive liquid, such as water, and stabilizing the dispersion by a thickening agent such as nonionic cellulose ether and stabilizing the dispersion by means of a dispersing agent such as water soluble alkylaryl alcohol.

---

My invention relates to an aqueous dispersion of thermoplastic synthetic polymer particles which are substantially insoluble in non-reactive liquid, and more particularly to an improved, sprayable dispersion for forming a fused protective coating on the interior surface of a metallic vessel or the like.

There are known in the prior art a number of thermoplastic synthetic polymers such as chlorinated polyether, or certain polymeric amides which are adapted to form strong, tough, dimensionally stable, chemically resistant, protective coatings on metallic surfaces. These polymers are substantially insoluble in non-reactive liquids. The futility of dissolving them in liquids which attack the surface to which the material is to be applied will readily be apparent.

One process which has been employed to apply a coating of such material is first depositing a powder of the thermoplastic material on the surface to be protected and then heating the surface to fuse the particles thus forming the continuous protective coating. Fluidized bed processes and electrostatic spraying processes have been used to deposit the particles. These processes are not satisfactory in many instances such, for example, as that in which the coating is to be applied to the interior surface of a large metallic vessel.

As a possible solution of the problem of applying the material to such an interior surface it has been suggested that the surface be spray-coated with an aqueous suspension of the material. Following the spraying the water is eliminated to permit the remaining material to be fused. This proposed solution involves two outstanding difficulties. First, I have discovered that particles applied in this manner from suspensions which are known in the art do not strongly adhere to the surface before fusing. Thus the coating is relatively easily disturbed when the coated article is transported, from the spraying station to the curing oven, for example. The result may be a defective coating.

A second difficulty in the use of an aqueous dispersion of the type known in the art is the tendency of the particles to settle from the suspension during storage. It often becomes necessary to add a quantity of dispersing agent after a period of time in storage.

I have invented an improved aqueous dispersion of thermoplastic particles which can be readily sprayed. It greatly facilitates the operation of depositing an adherent layer of particles on interior surfaces. The article carrying the layer so deposited can be handled and transported without disturbing the coating. My dispersion is stable and can be stored for extended periods of time without significant settling. Moreover, my dispersion is economical to prepare and use.

One object of my invention is the provision of an aqueous dispersion of thermoplastic synthetic polymer particles which can readily be sprayed.

Another object of my invention is the provision of an aqueous plastic dispersion for forming a coating which is not readily disturbed upon handling of the article carrying the coating.

A further object of my invention is the provision of an aqueous dispersion of thermoplastic synthetic polymer particles which can be stored for extended periods of time without harmful settling.

Still another object of my invention is the provision of an aqueous dispersion of thermoplastic particles which is economical to prepare and to use.

A still further object of my invention is to form a stable dispersion of relatively coarse thermoplastic particles.

Other and further objects of my invention will appear from the following description.

In general my invention contemplates the provision of a sprayable aqueous dispersion of a major amount of thermoplastic synthetic polymer particles and a minor amount of a suitable thickening agent which stabilizes the dispersion and which improves the adherence of the particles to a surface upon which the dispersion has been sprayed.

In the accompanying drawings which form part of the instant specification and which are to be read in conjunction therewith and in which like reference numerals are used to indicate like parts in the various views:

FIGURE 1 is a block diagram of the steps of one process for forming a protective coating with my improved dispersion; and FIGURE 2 is a sectional view of a metallic vessel the interior surface of which is coated with a protective layer of thermoplastic material.

More particularly, referring now to the drawing, I have shown one example of the manner in which I may apply my aqueous plastic dispersion to a surface to be coated to form the desired corrosion-resistant protective coating. The surface 14 to be coated may be the inner surface of an article such as a tank 16 adapted to receive the coating 12. As diagrammatically shown in FIGURE 1 of the drawings, I first clean the surface 14 by any suitable process known to the art, such as by blasting the surface with grit, sand or shot.

I have found that it is preferable to prime the surface 14 before applying the principal coat of my aqueous dispersion thereto. In performing this step I first spray the surface 14 with a suitable primer to be described and then fuse the primer by heating the surface to an appropriate temperature. When the priming operation is complete, or if no priming is necessary or desirable, I spray a coating of my aqueous dispersion on the surface 14. This may be achieved in any suitable manner known to the art, such as by use of a spray gun. When a coating of suitable thickness has been built up I permit the water to evaporate at room temperature to result in a film of dry particles adhering strongly to the surface 14.

When I have thus built up the layer of dry particles of thermoplastic material on the interior surface 14 of the article 16, I heat the article to a temperature sufficiently high to fuse the patricles of the layer. In performing the fusing step the article may be transported from the spraying station to a suitable oven or the like. It may be desirable to quench the article following the fusing operation.

For example, it might be immersed in a bath of water at room temperature. If desired, the coating can be built up by repeating the spraying and fusing operations. I have found that a coating having a thickness of about 25 mils is satisfactory for most applications.

Specifically, one form of my aqueous plastic dispersion suitable for use in the coating process described above is made up of the following component ingredients:

|  | Percentage by weight | |
|---|---|---|
|  | Preferred | Range |
| Water | 58.02 | 45-60 |
| Klucel-HA [1] | 0.31 | 0.3-0.4 |
| "Triton" X-100 [2] | 0.04 | 0.02-0.06 |
| Formaldehyde (37%) | 0.52 | 0-1 |
| "Penton" [3] | 41.11 | 35-50 |

[1] Klucel-HA is the trade name of Hercules Powder Co., Wilmington, Del., for a non-ionic water-soluble cellulose ether.
[2] "Triton" is the registered trademark of Rohm & Haas Co., Philadelphia, Pa., for a line of surface active agents including grades that have detergent, emulsifying, wetting, spreading and dispersing properties. "Triton" X-100 is a non-ionic water-soluble alkylaryl alcohol.
[3] "Penton" is the registered trademark of Hercules Powder Co., Wilmington, Del., for a chlorinated polyether thermoplastic polymer.

In my aqueous dispersion the principal component which is to form the desired coating is the chlorinated polyether which I employ in powdered form. Specifically, I may, for example, employ a powder having particle sizes such that 100% of the powder passes through a 60 mesh screen; 50% of the powder passes through a 100 mesh screen; and 20% passes through a 150 mesh screen. Alternatively, I have employed a powder with particle sizes such that 100% of the powder passes through a 60 mesh screen and 75% of the powder passes through a 200 mesh screen.

While I preferably employ a chlorinated polyether, I may alternatively use a powdered polyamide resin. When I use a polyamide resin, its percentage by weight in the dispersion is within the range of from about 30% to about 45%.

The non-ionic water-soluble cellulose ether of my dispersion acts as a thickening agent which stabilizes the dispersion and improves the adherence of the particles to the surface following the spraying operation.

The water-soluble alkylaryl alcohol functions as a dispersing agent in my dispersion to promote deflocculation and separation of the particles of the powdered thermoplastic resin. Alternatively to employing that particular dispersing agent, I may use "Pluronic" L62-LF. "Pluronics" is the registered trademark of Wyandotte Chemical Corp., Wyandotte, Mich., for a series of high molecular weight non-ionic surfactants. "Pluronic" L62-LF is a non-ionic polyoxyethylene-polyoxypropylene dispersing agent. This latter agent, however, requires a somewhat greater quantity for the formulation of my dispersion and hence is not preferred. For example, the formulation of a specific dispersion may require 3.0% by weight of this agent. That is, I prefer to use as small amounts as possible of thickening and dispersion agents to avoid retention in the coating of any quantities of such materials as might detract from the coating.

The 37% by volume solution of formaldehyde serves to prevent bacterial decomposition of the cellulose ether for long periods of time in storage. If in the use of my dispersion it need not be stored for more than three or four months the formaldehyde may be omitted.

The range of powdered thermoplastic resin in the above example may readily be explained as follows. If the ratio of water to particles is less than about one-to-one the dispersion becomes too thick for effective spraying. A ratio of water to particles greater than about three-to-two affords no advantage and requires an excessively long period of time for evaporation of the water.

I have also discovered that the ratio of cellulose ether to water should be between about 0.50% and about 0.75%. An amount in excess of the 0.75% limit results in a dispersion which is difficult to spray and which forms a somewhat inferior protective coating. An amount of cellulose ether less than that required to result in the lower limit has no advantage and requires an excessively long time for drying.

In preparing my aqueous dispersion, I first add the cellulose ether thickening and stabilizing agent to the water. I next add the alkylaryl alcohol dispersing agent and the formaldehyde, and finally the thermoplastic powder such as the powdered chlorinated polyether. All of the ingredients may be at room temperature. After adding each of the components, I thoroughly agitate the mixture finally to produce my aqueous plastic dispersion.

One form of primer which I have employed includes the following constituent ingredients:

|  | Preferred | Range |
|---|---|---|
| Percentage by weight: |  |  |
| Denatured alcohol | 53.7 | 50-60 |
| Klucel-HA | 0.3 | 0.2-0.5 |
| "Penton" and cobalt oxide | 46.0 | 35-50 |

In making the primer dispersion I prefer to use a ratio of about three parts of the chlorinated polyether particles to one part of black cobalt oxide particles. While water may be used in place of the alcohol as a carrier, I prefer to use the alcohol to minimize rusting of the freshly cleaned surface.

In forming a coating 12 on the surface 14 of a body 16 by use of my aqueous plastic dispersion, I first prepare the dispersion in the manner outlined above with water, a thermoplastic resin powder, a thickening and a dispersing agent. I may also prepare a primer dispersion if application of a primer is necessary or desirable.

Having prepared the dispersions, I first clean the surface to be coated by blasting or by any other suitable method. Where used, the primer is next sprayed on the surface 14 and then is fused. When the fusing operation of the primer is complete, I spray the coating of my aqueous dispersion on the primed surface and then permit the water to evaporate at room temperature to leave a coat of dry particles. The particles are then fused and, if necessary or desirable, the article is quenched.

In performing the fusing operation the article may be transported from the spraying station to a suitable oven and the coating will not be appreciably disturbed. The temperature at which the fusing operation takes place will be determined by the particular thermoplastic material which I employ. Where I use a chlorinated polyether I fuse the coating at a temperature of about 490° F. If I use a polyamide resin the fusing temperature is about 550° F.

It will be seen that I have accomplished the objects of my invention. I have provided a readily sprayable aqueous plastic dispersion. The coating resulting from the use of my dispersion permits the article carrying the coating to be transported and handled without disturbing the coating. My dispersion is stable and permits storage thereof for relatively long periods of time without appreciable settling of the particles and without requiring the addition of a dispersion agent. It is relatively inexpensive to produce.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described:

Having thus described my invention, what I claim is:

1. A sprayable dispersion including an aqueous medium, a major amount of a powdered thermoplastic resin selected from the group consisting of polyamide resin and chlorinated polyether resin, dispersed in said aqueous medium, said powdered thermoplastic resin having a particle size such that substantially 100 percent thereof passes through a 60 mesh screen, about 50 percent thereof passes through a 100 mesh screen, and about 20 percent thereof passes through a 150 mesh screen, and a minor amount of a thickening agent for stabilizing said dispersion.

2. A sprayable dispersion as in claim 1 including a minor amount of a dispersing agent.

3. A sprayable dispersion as in claim 1 in which said resin is a chlorinated polyether.

4. A sprayable dispersion as in claim 1 in which said thermoplastic resin is a polyamide resin.

5. A sprayable dispersion as in claim 1 in which said powdered resin has a particle size such that substantially 100% thereof passes through a 60 mesh screen and 75% thereof passes through a 200 mesh screen.

6. A sprayable dispersion as in claim 1 in which said thickening agent is a nonionic cellulose ether.

7. A sprayable dispersion as in claim 1 including a minor amount of a nonionic alkylaryl alcohol dispersing agent.

8. A sprayable dispersion as in claim 1 including a minor amount of a nonionic polyoxyethylene-polyoxypropylene dispersing agent.

9. A sprayable dispersion as in claim 1 including a minor amount of formaldehyde.

10. A sprayable aqueous dispersion including from about 45 to about 60 percent by weight of water, from about 35 to about 50 percent by weight of powdered chlorinated polyether, said powdered chlorinated polyether having a particle size such that substantially 100 percent thereof passes through a 60 mesh screen, about 50 percent thereof passes through a 100 mesh screen, and about 20 percent thereof passes through a 150 mesh screen, a minor amount of the dispersing agent and a minor amount of a thickening agent.

11. A dispersion as in claim 10 in which said thickening agent is from about 0.3 to about 0.4 percent by weight of cellulose ether.

12. A sprayable aqueous dispersion including about 58.02 percent by weight of water, about 41.11 percent by weight of powdered chlorinated polyether, said powdered chlorinated polyether having a particle size such that substantially 100 percent thereof passes through a 60 mesh screen, about 50 percent thereof passes through a 100 mesh screen, and about 20 percent thereof passes through a 150 mesh screen, a minor amount of the dispersing agent and about 0.04 percent by weight of a nonionic alkylaryl alcohol.

References Cited

UNITED STATES PATENTS

| | | | |
|---|---|---|---|
| 2,405,965 | 8/1946 | Leekly | 260—29 |
| 3,164,562 | 1/1965 | Breed | 260—29.6 |
| 2,794,027 | 5/1957 | Schilling | 260—333 |
| 2,824,848 | 2/1958 | Wittcoff | 260—29.2 |
| 3,089,783 | 5/1963 | Carlson et al. | 117—66 |
| 3,242,120 | 3/1966 | Steuber | 260—29.6 |
| 3,300,423 | 1/1967 | Brown et al. | 216—17 |
| 3,422,049 | 1/1969 | McClain | 260—29.2 XR |

OTHER REFERENCES

Walker: "Formaldehyde," p. 471, Reinhold, 1953.

WILLIAM H. SHORT, Primary Examiner

E. NIELSEN, Assistant Examiner

U.S. Cl. X.R.

117—132, 161; 260—29.2